May 31, 1938.  J. H. MEECH  2,118,853
TRANSMISSION
Filed June 1, 1935  4 Sheets-Sheet 1

INVENTOR:
James H. Meech.
by Dike, Calver, & Gray.
Attys.

May 31, 1938.   J. H. MEECH   2,118,853
TRANSMISSION
Filed June 1, 1935    4 Sheets-Sheet 2
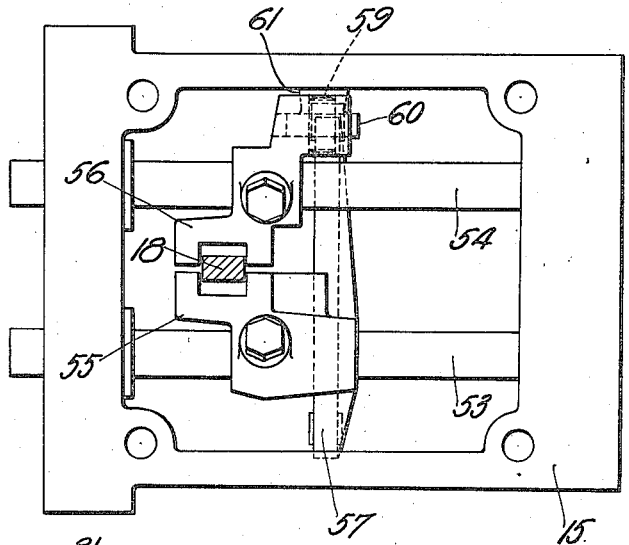
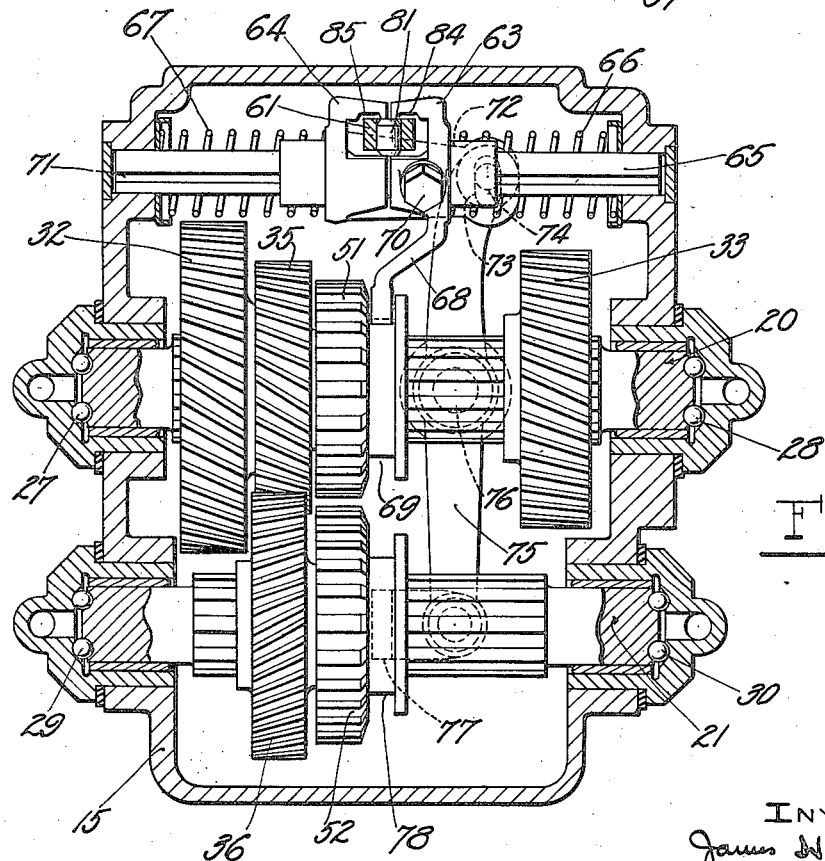

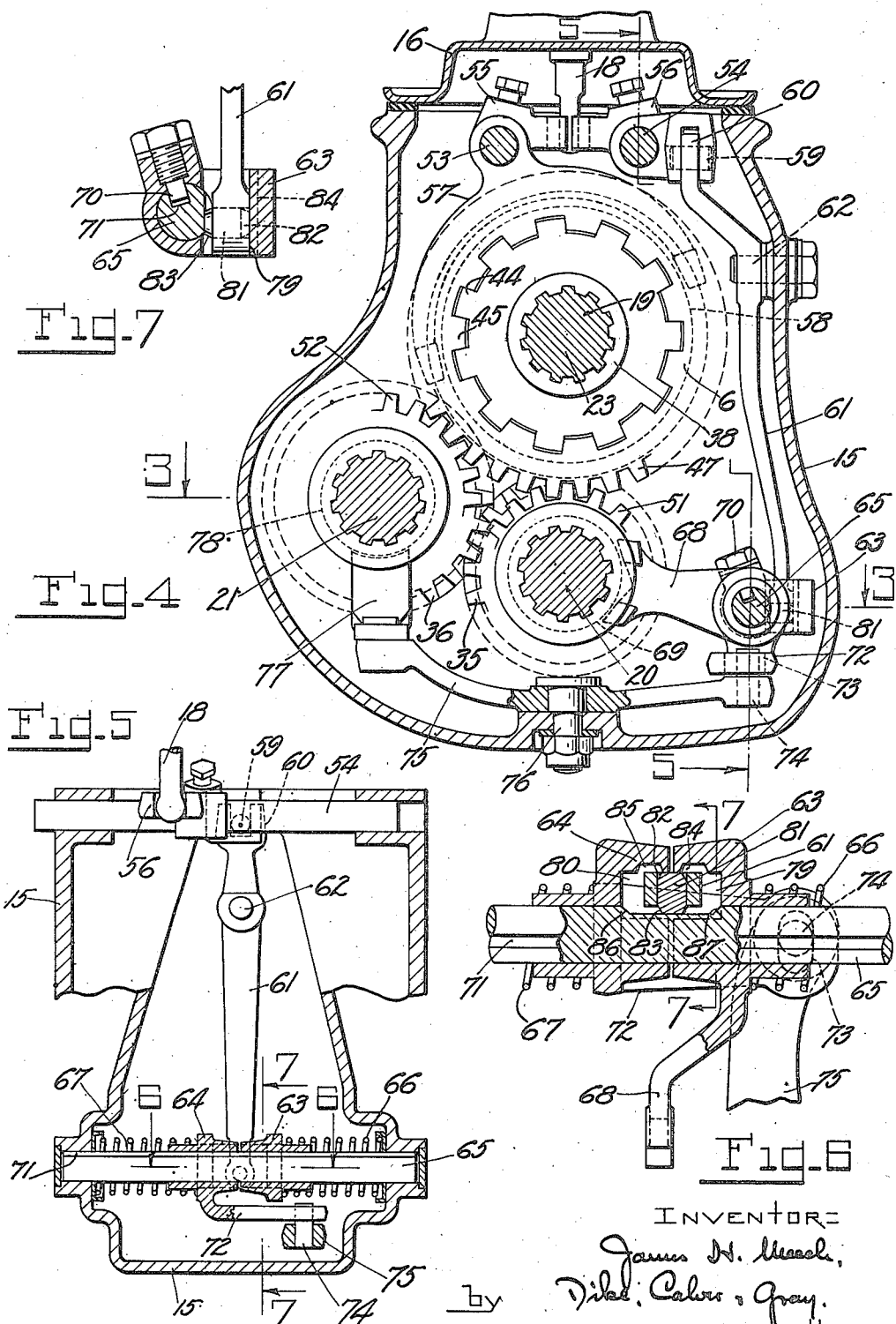

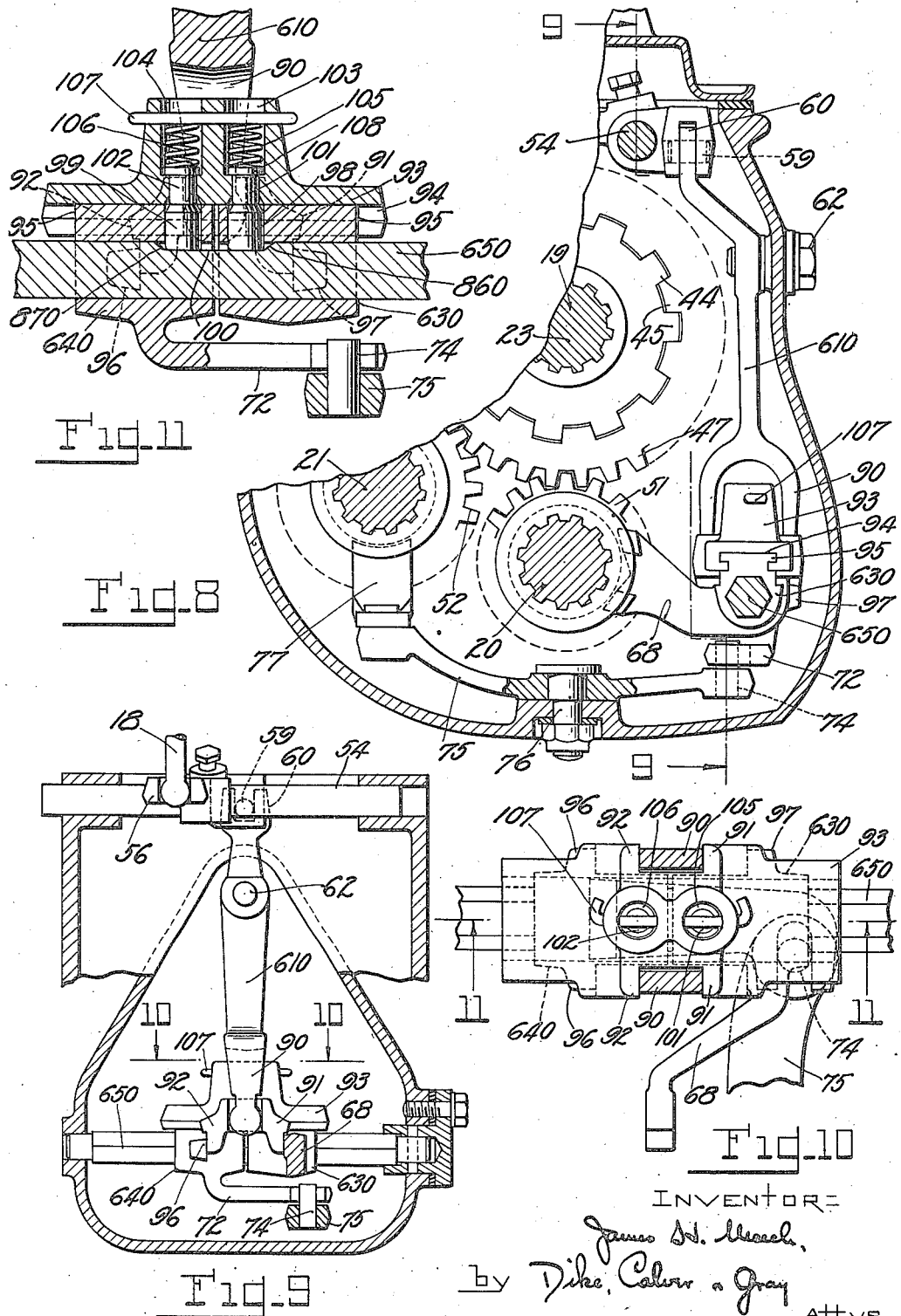

Patented May 31, 1938

2,118,853

UNITED STATES PATENT OFFICE 2,118,853

TRANSMISSION

James Harold Meech, Detroit, Mich., assignor to Hudson Motor Car Company, Detroit, Mich., a corporation of Michigan Application June 1, 1935, Serial No. 24,496

4 Claims. (Cl. 74—355)

This invention relates to transmission gear sets for motor vehicles and has for its general object to devise a relatively light and compact gear set of this character which provides for the conventional three-speed forward and reverse drives controlled by the conventionally operated gear shift element or lever, and which also permits the use, if desired, of gear synchronizing devices as well as a relatively silent drive through constant mesh spiral gears in close proximity to the shaft bearings.

Modern motor vehicle design and present day driving conditions and practices impose extreme torque loads upon the transmission shafts, particularly at first and second speeds, and these, in turn, produce a tendency to deflection which amplifies any slight eccentricity which may exist, causing incorrect meshing of the spiral gears and abnormal stress at the tooth addendum with consequent gear noise and eventual tooth fatigue. This tendency varies directly with the lengths of the shafts and inversely with their diameters. Since, in the conventional transmission, shaft lengths cannot be materially reduced, previous attempts to overcome the above objectionable tendencies have been by recourse to increased shaft diameters. Such increases in diameter, if sufficient to be effective, have materially added to the weight and bulkiness of the transmission and to the difficulties of gear shifting. In accordance with the present invention the desired result is accomplished by so rearranging the gears as to permit a material shortening of the shafts and the location of the spiral gears in close proximity to the shaft bearings, where the effects of deflection, if any, are minimum, all without changing, except to facilitate, the conventional mode of operation.

The foregoing and other objects of the invention, together with means whereby the same may be carried into effect, will best be understood from the following description of certain illustrative embodiments thereof shown in the accompanying drawings, these embodiments, however, being chosen for purposes of exemplification merely, as it will be obvious to those skilled in the art that the invention, as defined by the claims hereunto appended, may be otherwise embodied without departure from the spirit and scope thereof.

In said drawings:

Fig. 2 is a plan view of the gear shifting elements.

Fig. 3 is a section taken substantially on the lines 3—3, Figs. 1 and 4.

Fig. 4 is a vertical transverse section taken substantially on the line 4—4, Fig. 1.

Fig. 5 is a fragmentary vertical section taken substantially on the line 5—5, Fig. 4.

Fig. 6 is a detail section taken substantially on the line 6—6, Fig. 5.

Fig. 7 is a detail section taken substantially on the lines 7—7, Figs. 5 and 6.

Figs. 8 and 9 are views corresponding to Figs. 4 and 5, respectively, showing a modification.

Fig. 10 is a section taken substantially on the line 10—10, Fig. 9.

Fig. 11 is a section taken substantially on the line 11—11, Fig. 10.

Figure 1:
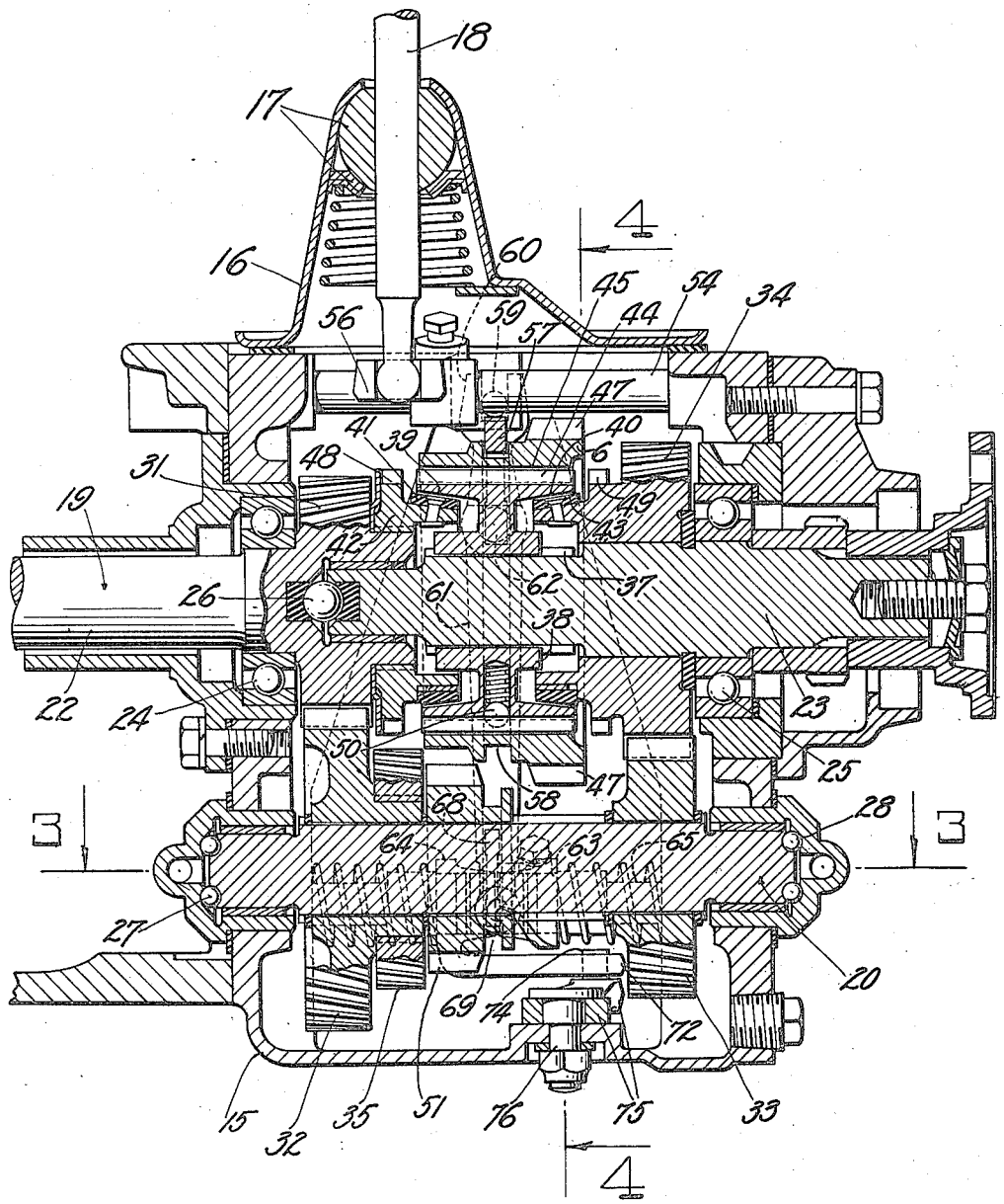
Fig. 1 is a central vertical longitudinal section through the complete transmission.

Referring to Figs. 1, 3, and 4, the transmission casing 15 is of a suitable size and shape to enclose the mechanism hereinafter described and affords the necessary supports, guides, etc., for the various moving parts. Said casing is provided with a cover 16 carrying a suitable universal joint bearing 17 for the conventional gear shift lever 18.

Mounted in the casing 15 are three parallel shafts comprising a main transmission shaft 19, a countershaft 20, and a reverse shaft 21. The main transmission shaft 19 comprises alined driving and driven sections 22 and 23, the former being journalled in an anti-friction bearing 24 in the front wall of the casing 15, and the latter being journalled in an anti-friction bearing 25 in the rear wall of the casing, its forward end being further journalled in a thrust bearing 26 in the rear end of the driving section 22. The countershaft 20 is journalled in thrust bearings 27 and 28 in the front and rear walls of the casing 15, while the reverse shaft 21 is likewise journalled in similar front and rear bearings 29 and 30.

Fast upon, or preferably formed integral with, the driving section 22 adjacent its rear end and immediately adjacent the bearing 24 is a spiral gear 31 in constant mesh with a spiral gear 32 fast upon the countershaft 20 immediately adjacent the bearing 27. Also fast on the countershaft 20 immediately adjacent the bearing 28 is a spiral gear 33 in constant mesh with a spiral gear 34 rotatably mounted on the driven section 23 immediately adjacent the bearing 25. Also fast on the countershaft 20 immediately adjacent the gear 32, and preferably pressed on the hub of the latter, is a spiral gear 35 in constant mesh with a spiral gear 36 fast on the reverse shaft 21 immediately adjacent the bearing 29.

The driven section 23 is formed adjacent its forward end with a splined portion 37 on which is slidably mounted a hub 38 having internal conical friction clutch surfaces 39 and 40. The clutch surface 39 cooperates with a complementary friction clutch surface 41 formed on a clutch member 42 fast upon the driving section 22 immediately in the rear of the gear 31. The clutch surface 40 cooperates with a complementary friction clutch surface 43 formed on the hub of the gear 34. The exterior surface of the hub 38 is formed with longitudinal splines 44 which coact with internal splines 45 (see particularly Fig. 4), on the hub 6 of a spur gear 47, said internal splines 45 also serving as positive or dog clutch elements cooperating with complementary elements 48 and 49 on the clutch member 42 and the hub of the gear 34, respectively. The hubs 38 and 6 are normally coupled for longitudinal movement in unison by spring pressed detents 50 which, however, are releasable, when sufficient longitudinal force is exerted upon the hub 6 while the hub 38 is held against longitudinal movement by engagement of the clutch surfaces 39, 41 or 40, 43, to permit engagement of the splines or clutch elements 45 with the clutch elements 48 and 49.

Splined upon the countershaft 20 and reverse shaft 21, respectively, are two spur gears 51 and 52, said gears normally occupying positions immediately adjacent the gears 35 and 36, respectively, but being alternatively shiftable rearwardly from these positions into mesh with the spur gear 47, as hereinafter explained.

Slidably mounted in the upper part of the casing 15 are two parallel shifter slides 53 and 54 having notched portions 55 and 56 which cooperate in the conventional manner with the gear shift lever 18. The slide 53 is provided with a fork 57 which engages a groove 58 in the hub 6 of the gear 47, whereby the latter may be shifted forwardly and rearwardly as above mentioned. The slide 54 carries a pin 59 (see also Fig. 5) embraced by the forked upper end 60 of a lever 61 pivoted intermediate its ends at 62 to the side wall of the casing 15. The lower end of the lever 61 cooperates with a pair of slides 63 and 64 guided for longitudinal movement on a rod 65 secured at its ends in the end walls of the casing 15, said slides being normally held in the neutral positions shown in Figs. 3, 5, and 6 by springs 66 and 67 interposed between said slides respectively and the casing walls. The slide 63 carries a fork 68 which engages a groove 69 in the hub of the gear 51, said slide being held against turning about the rod 65 by a pin 70 (see Fig. 7) which engages a groove 71 in said rod. The slide 64 is formed with an arm 72 the free end of which is slotted, as shown at 73, to receive a pin 74 carried by one end of a lever 75 pivoted intermediate its ends at 76 to the bottom wall of the casing and having pivoted to its opposite end a finger or fork 77 engaging a groove 78 in the hub of the gear 52.

The lower end of the lever 61 is received in recesses 79 and 80 in the slides 63 and 64 and has slidably mounted therein a pin 81 having tapered or chamfered ends 82 and 83 which cooperate respectively with notches 84 and 85 in the walls of the recesses 79 and 80 and with cam surfaces 86 and 87 formed on the rod 65. The arrangement is such that when the lower end of the lever 61 is moved toward the right from the neutral position shown in Figs. 5 and 6, it will first engage the end wall of the recess 79, moving the slide 63 to the right in opposition to the spring 66, thereby causing the fork 68 to move the gear 51 rearwardly into mesh with the gear 47. During the course of this movement, engagement of the end 83 of the pin 81 with the cam surface 87 causes said pin to be slid laterally in the lever to engage its end 82 with the notch 84, thereby positively locking the lever to the slide. Consequently, when the lever is returned to neutral position, engagement of said pin with said notch will cause said slide to be positively returned substantially to normal position independently of the spring 66. During the movement of the slide 63 to mesh the gear 51 with the gear 47, the slide 64 is prevented from following under the influence of its spring 67, since at this time the gear 52 is laterally engaged with the hub of the gear 36. Similarly when the lever 61 is moved toward the left from neutral position, the slide 64 is moved toward the left and acts through the arm 72, lever 75 and fork 77 to move the gear 52 into mesh with the gear 47, following movement of the slide 63 under the influence of the spring 66 being prevented by engagement of the gear 51 with the hub of the gear 35 or with an intermediate spacing collar.

To connect the parts for the low or first speed drive, the slide 54 is moved toward the left from the neutral position shown in Fig. 5, thereby causing the lever 61 to move the slide 63 toward the right and move the gear 51 rearwardly into mesh with the gear 47. The drive is then from the driving shaft section 22 to the driven shaft section 23 through the gears 31 and 32, countershaft 20, gears 51 and 47, and hubs 6 and 38.

For the reverse drive, the slide 54 is moved toward the right from the neutral position shown in Fig. 5, thereby causing the lever 61 to move the slide 64 toward the left, so that the arm 72, lever 75 and fork 77 operate to move the gear 52 rearwardly into mesh with the gear 47. The drive is then through gears 31, 32, 35, and 36, reverse shaft 21, gears 52 and 47, and hubs 6 and 38.

For the second or intermediate speed drive, the slide 53 is moved rearwardly or toward the right from the neutral position shown in Fig. 2, thereby causing the fork 57 to move the hubs 38 and 6 toward the rear, these hubs moving in unison until the friction clutch surfaces 40 and 43 are engaged, whereupon the coupling 50 yields to permit the engagement of the positive clutch elements 45 and 49. The drive is then through the gears 31 and 32, countershaft 20, gears 33 and 34, and hubs 6 and 38.

For the direct or high speed drive, the slide 53 is moved toward the left from the neutral position shown in Fig. 2, thereby causing the fork 57 to shift the hubs 6 and 38 forwardly, first engaging the friction clutch 39, 41 and thereafter engaging the positive clutch elements 45 and 48. The drive is then through the clutch member 42 and hubs 6 and 38.

In Figs. 8 to 11 inclusive is shown a modification of the mechanism above described for operating the gears 51 and 52. In this construction the slides 630 and 640, which correspond to the slides 63 and 64 of the arrangement first described, are slidably mounted on a fixed rod 650 of hexagonal cross section and corresponding to the rod 65. The lever 610, which corresponds to the lever 61, has a bifurcated lower end 90 the arms of which engage, at opposite sides and without substantial lost motion, lugs 91 and 92 on a slide 93 having an undercut groove 94 to receive T-shaped heads or flanges 95 on the slides 630 and 640, whereby the former slide is guided on the latter slides for movement longitudinally of the rod 650, i. e., parallel to the movement of the slides 630 and 640. The lugs 91 and 92 extend downwardly, at opposite sides of the slide 93, below the bifurcated end 90 of the lever 610, as shown most clearly in Fig. 9, to cooperate with the slides 630 and 640, the lugs 92 engaging lugs 96 at opposite sides of the slide 640, and the lugs 91 engaging a similar lug 97 at one side of the slide 630 and the arm 68 at the opposite side of said slide. The slides 630 and 640 carry detents in the form of pins 98 and 99 (see Fig. 11) slidably mounted therein, which pins cooperate with cam surfaces 860 and 870 at opposite ends of a groove 100 formed in the rod 650. The pins 98 and 99 are normally projected into the groove 100 by plungers 101 and 102 guided in apertures 103 and 104 in the slide 93, said plungers being normally urged toward said pins by springs 105 and 106 interposed between them and a transverse pin 107 carried by said slide 93, the movement of said plungers under the influence of said springs being limited by engagement of heads 108 thereon with shoulders formed in the interior of the apertures 103 and 104.

When the lower end of the lever 610 is moved toward the right from the neutral position shown in Figs. 9, 10, and 11, the slide 93 moves with it, and engagement of the lug 91 with the lug 97 and arm 68 causes a corresponding movement toward the right of the slide 630, the slide 640 remaining stationary, and the slide 93 moving thereover. During the first part of this movement the pin 98 engages the cam surface 860 and is moved outwardly thereby into the inner end of the aperture 103, forcing the plunger 101 outwardly against the tension of its spring 105, thereby positively locking or coupling the slide 630 with the slide 93, so as to move with the latter into gear meshing position and back into neutral position. When the lower end of the lever 610 is moved toward the left from the neutral position shown in Figs. 9, 10, and 11, the slide 640 will be similarly operated, the slide 630 remaining stationary. The operation of this mechanism is otherwise the same as that of the mechanism shown in Figs. 4 to 7, as will, it is thought, be obvious without further explanation.

I claim:

1. In a variable speed transmission, a driving shaft, a countershaft geared thereto, a reverse shaft geared to said countershaft, a driven shaft, a gear on said driven shaft, and gears on said countershaft and reverse shaft alternatively shiftable each in one direction only, and both in the same direction, from neutral position into mesh with the gear on said driven shaft.

2. In a variable speed transmission, a driving shaft, a driven shaft, a countershaft, a reverse shaft, bearings for said shafts, gears connecting said countershaft with said driving, driven, and reverse shafts, all of said gears being located adjacent the bearings for the respective shafts by which they are carried, a gear on said driven shaft, and gears on said countershaft and reverse shaft alternatively shiftable from neutral position into mesh with said last named gear.

3. In a variable speed transmission, a driving shaft, a driven shaft, a countershaft, a reverse shaft, bearings for said shafts, gears connecting said countershaft with said driving, driven, and reverse shafts, all of said gears being located adjacent the bearings for the respective shafts by which they are carried, a gear on said driven shaft between said first named gears, and gears on said countershaft and reverse shaft alternatively shiftable from neutral position into mesh with said last named gear.

4. In a variable speed transmission, a driving shaft, a driven shaft, a countershaft, a reverse shaft, constantly meshed gears connecting said countershaft with said driving, driven, and reverse shafts, one of the gears of the pair connecting the countershaft with the driven shaft being loose on the latter shaft, a clutch member on the driven shaft for clutching said last named gear thereto, a gear carried by said clutch member, and gears on said countershaft and reverse shaft alternatively shiftable into mesh with said clutch member gear.

JAMES HAROLD MEECH.